United States Patent [19]

Hackbarth et al.

[11] 4,052,255

[45] Oct. 4, 1977

[54] SPRAY DRYER DISCHARGE SYSTEM

[75] Inventors: Lowell E. Hackbarth, Bel Air; Sterling W. Pyle, Aberdeen; Paul W. Brandon, Havre de Grace, all of Md.

[73] Assignee: J. M. Huber Corporation, Locust, N.J.

[21] Appl. No.: 620,463

[22] Filed: Oct. 7, 1975

Related U.S. Application Data

[63] Continuation of Ser. No. 187,470, Oct. 7, 1971, abandoned.

[51] Int. Cl.² .............................................. B01D 1/18
[52] U.S. Cl. ..................................... 159/4 B; 159/4 S
[58] Field of Search ..................... 159/4 R, 4 CC, 4 C, 159/4 D, 48 R, 4 MS, 4 B, 4 F, 4 S

[56] References Cited

U.S. PATENT DOCUMENTS

| | | | |
|---|---|---|---|
| 1,785,533 | 12/1930 | Schwantes | 159/4 CC |
| 1,829,477 | 10/1931 | Douthitt | 159/DIG. 23 |
| 1,971,566 | 8/1934 | Hutton | 159/4 R |
| 1,983,434 | 12/1934 | Black et al. | 159/4 C |
| 2,555,516 | 6/1951 | Stoneman | 159/4 D |
| 2,559,989 | 7/1951 | Nyrop | 159/4 B |

FOREIGN PATENT DOCUMENTS

| | | | |
|---|---|---|---|
| 637,243 | 3/1962 | Italy | 159/4 MS |
| 116,531 | 3/1957 | U.S.S.R. | 159/4 MS |

Primary Examiner—Norman Yudkoff
Attorney, Agent, or Firm—Robert L. Price; Harold H. Flanders; Ernest A. Schaal

[57] ABSTRACT

A new and improved discharge system for a spray dryer that permits the immediate exit of dry solids from the chamber of a spray dryer is disclosed. The spray dryer apparatus of the invention comprises a cylindrical drying chamber having a lower conically shaped discharge portion. The liquid or slurry is introduced into the drying chamber in the form of fine droplets which are contacted with a stream of hot gas that evaporates the liquid, leaving residual particles of dry solids. The solids are collected in the discharge portion of the dryer. The latter, i.e., the conical bottom is provided with a series of openings or slots near the bottom discharge outlet. Vacuum means, such as an exhaust fan creates a vacuum in the discharge outlet so that outside air is pulled in through the openings and the air conveys the solids immediately as they are collected. The solids in the stream of air are recovered by means of a gas-solids separator such as a cyclone separator.

2 Claims, 2 Drawing Figures

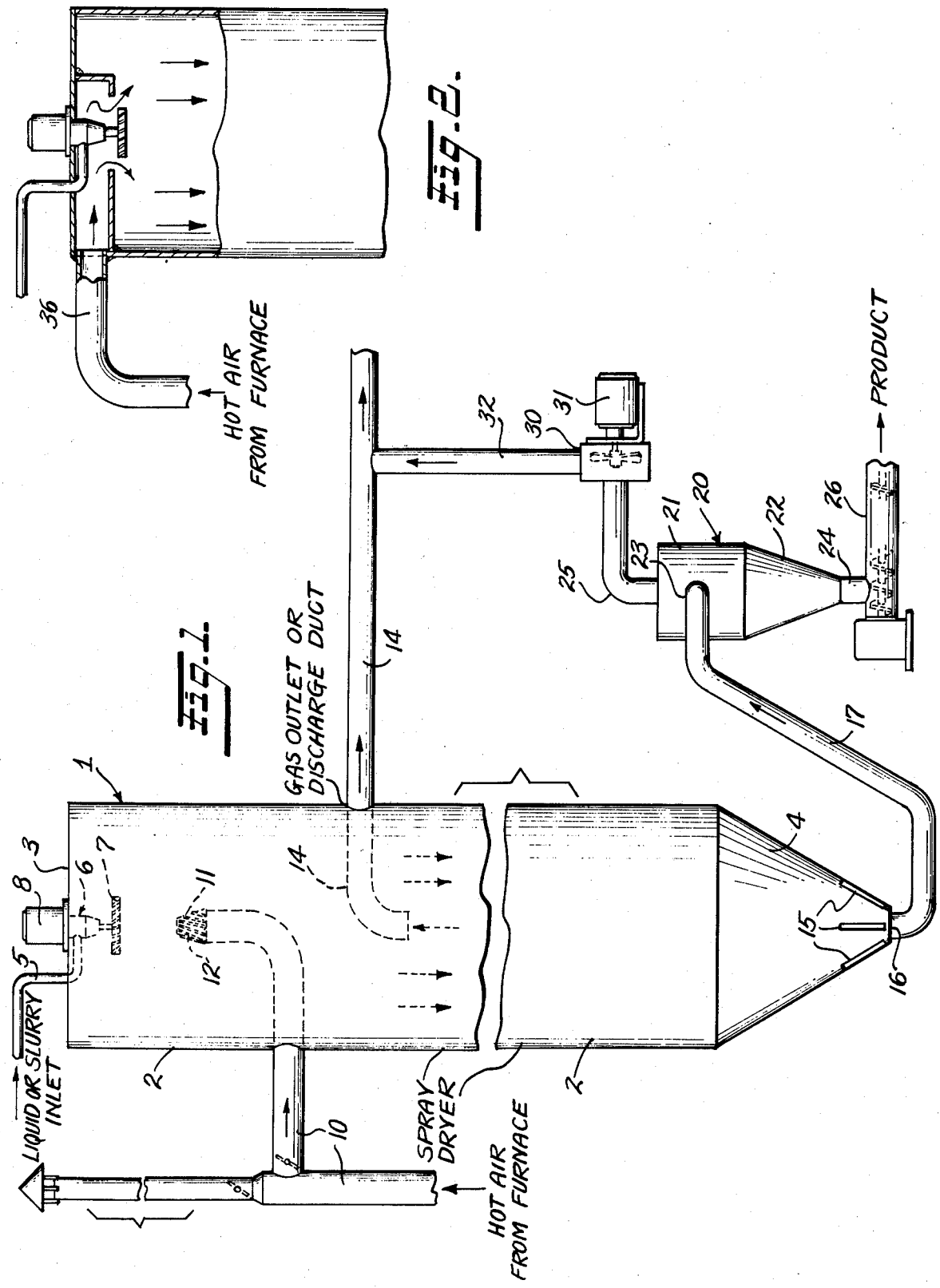

SPRAY DRYER DISCHARGE SYSTEM

This is a continuation of application Ser. No. 187,470, filed Oct. 7, 1971.

BACKGROUND OF THE INVENTION

1. FIELD OF THE INVENTION

The present invention relates to the spray drying of liquids or slurries and more particularly, to an improved spray dryer discharge system that permits the immediate exit of dried material from the chamber of a spray dryer.

2. DESCRIPTION OF THE PRIOR ART

As known in the art, the term "drying" refers to, and may be broadly defined as, the removal of water from solids, liquids, or gases. The drying of solids may be effected in various apparatus including tray dryers, tunnel dryers, rotary dryers and the like. The drying or removal of water from gases may be effected, for example, by adsorption on a solid, such as silica gel or alumina. In general there are two basic apparatus employed for drying liquids or slurries. These are the drum dryer and the spray dryer. The former consists of one or more heated metal rolls on the outside of which a thin layer of liquid is evaporated to dryness. The dried solid is scrapped off the rolls as they slowly revolve. In a spray dryer a liquid (i.e., a solution) or slurry is dispersed into a stream of hot gas in a manner such that water is rapidly vaporized, leaving residual solid particulates. Many types of commercial dryers are known and described in standard references such as Riegel, E. R.: "Chemical Process Machinery", 2ed., Chapter 17, Reinhold Publishing Corp., New York, (1953) and Perry, J. H.: "Chemical Engineers Handbook", 4th ed., McGraw-Hill Book Co., Inc., New York (1960).

In recent years spray dryers have found increasing and ever expanding uses in chemical and related industries due to their very short drying time and the ability to obtain the desired consistency, bulk density, appearance, and flow properties of many products, such as foods or synthetic detergents.

As briefly discussed above, in a spray dryer a slurry or solution is dispersed into a stream of hot gas in the form of a mist of fine droplets. Moisture is rapidly vaporized from the droplets leaving residual particles of dry solid, which are then separated from the gas stream. The flow of liquid and gas may be cocurrent, countercurrent or a combination of both. The droplets are formed (usually within a generally vertical and cylindrical drying chamber) either by spray nozzles or by highspeed spray wheels or discs. Spray drying chambers having diameters on the order of 5–30 feet are common in the industry.

In a cocurrent spray dryer, liquid feed is pumped or introduced into a spray nozzle or wheel positioned in the top or roof of the chamber. The spray assembly atomizes the liquid into tiny droplets which are thrown radially into a stream of hot gas, which enters near the top of the chamber. Cooled or exhaust gas is removed through a discharge line positioned in the vertical side walls of the chamber. The dry solids settle out of the gas into the bottom of the drying chamber and are conventionally withdrawn therefrom by a screw conveyor through a rotary airlock.

In a countercurrent unit, the liquid solution or slurry is introduced into the spray assembly (also positioned in the roof or upper zone of the drying chamber) with the stream of hot gas being introduced at a point near the bottom or intermediate of said drying chamber and in an upwardly direction i.e., "countercurrent" to the flow of the droplets.

A so-called mixed-flow spray dryer utilizes both parallel and countercurrent flow of solids and gases. Here the drying chamber has a short cylindrical upper section and a long bottom cone. Hot gas is admitted to the drying chamber tangentially near the top. The gas spirals near the walls, then reverses direction and spirals upwardly and leaves through an outlet duct at the top. Feed liquid enters through a spray assembly in the roof of the drying chamber. The liquid evaporates and passes outward into the outer spiral gas stream. The dry solids are swept toward the walls and downwardly to the bottom of the cone where they are removed.

Notwithstanding the type of spray dryer employed (and their continued use in the industry) known spray drying apparatus or systems suffer from a serious disadvantage. Thus in known spray dryers, the dried material often adheres to, and "arches" over, the bottom discharge outlet of the drying chamber which results in the "plugging" and/or stoppage of flow of solids from said discharge outlet.

In this regard and before turning to the details of the present invention, masses of solid particles, especially when the particles are very dry and not sticky, have many of the properties of a fluid. That is, they exert pressure on the side walls of a container, they flow through openings, etc. When an outlet containing freeflowing solids is opened, the material immediately above the opening begins to flow. A central column of solids move downward without disturbing the material at the sides. Eventually lateral flow begins, first from the uppermost layer of solids. A conical depression is formed on the surface of the mass. The solids at, or near, the walls are the last to leave. The material slides laterally into the central column at an angle approximating the angle of the internal friction of the solids. If additional material is added to the mass of solids at the same rate as the material flowing out of the bottom, the solids near the bin walls remain stagnant and do not discharge.

With cohesive or sticky solids, particularly at higher temperatures, it is often even difficult to initiate flow at the outset. Once flow does start however, it again begins in the material directly above the discharge opening. Frequently the column of solids above the discharge outlet moves out as a "plug" leaving a "hole" with nearly vertical sides. Sticky solids, as well as the so-called dry powders adhere strongly to the vertical surfaces and have sufficient shear strength to support a "plug" of considerable diameter.

Further, with very cohesive solids, there is a problem of "arching" which in many cases is strong enough to support the overlaying solid even when the discharge outlet is opened.

SUMMARY OF THE INVENTION

As briefly discussed above and particularly in view of the nature of the materials processed in spray dryers (e.g., pharmaceuticals, confectionates, detergents, ammonium nitrate fertilizers, silicates and the like) the clogging of the discharge outlet of a spray dryer has created a serious problem to prior art workers. While a number of proposals have been made to obviate or at least reduce this problem (such as the provision of mechanically or pneumatically operated hammers or vibrators on the outer walls of the conical bottom, sloping of the sides of the bottom at an angle larger than the "angle of repose" of the material handled) no such proposal has proved to be completely successful.

In summary, the present invention is directed to an improved and unique spray dryer discharge system which permits the immediate withdrawal of the dry material from the drying chamber. The spray drying system of the invention has increased capacity or throughput and is not subject to the problems associated with conventional spray dryers, i.e., intermittent flow, "overdrying" of the small droplets and the like.

Stated broadly, the present invention is based on the discovery that the above noted difficulties can be overcome by providing one or more apertures or slots near the discharge outlet of the spray dryer and creating a vacuum therein by the use of a suitable suction fan or pump located adjacent to and in operative communication with the discharge outlet. A solids-gas separator is positioned intermediate the fan and the discharge outlet and in operative communication therewith so that the product may be easily recovered. Thus when the unique apparatus of the invention is in operation, cool air (i.e., air at ambient temperatures) is pulled through the slots or openings and air conveys the material to the cyclone for recovery of the solids.

It is accordingly a general object of this invention to provide an improved spray dryer discharge system that is not subject to the disadvantages of the prior art.

Another and more particular object is to provide a discharge system for a spray dryer that prevents plugging or clogging of the discharge outlet.

Yet still another object is to provide a highly efficient and economical method for conveying sticky and cohesive dry powders from the outlet end of a spray dryer.

Still another object is to provide an improved spray dryer system that is efficient in operation, relatively easy to operate and may be operated in such a manner so that the characteristics of the dried product, i.e., the plasticity, cohesiveness, the percent moisture of the solid particulates, etc., may be accurately regulated.

Yet still another object is to provide an improved spray dryer having increased capacity and not subject to problems associated with conventional spray dryers.

The manner in which the foregoing and other objects are achieved in accordance with the present invention will be better understood in view of the following detailed description and accompanying drawings, which form a part of the specification and wherein:

FIG. 1 is a diagrammatic illustration, shown in elevation, of a suitable and particularly advantageous arrangement of apparatus that may be employed in the practice of the present invention.

FIG. 2 is a diagrammatic illustration, shown in elevation, of an alternate form of the spray drying chamber illustrated in FIG. 1.

DESCRIPTION OF PREFERRED EMBODIMENTS

Turning now to the drawings in detail and with reference first to FIG. 1, there is shown a spray dryer, indicated generally at 1, having a generally vertical and cylindrical outer wall 2, a top or cover 3, and a conical bottom or discharge portion 4.

In this regard, a spray assembly, indicated at 6, is set or positioned in the top 3 of the drying chamber. The spray assembly includes a high speed spray wheel 7 that is driven by suitable means such as the motor 8.

The liquid solution or slurry is introduced through suitable conduit means 5 connected to, and in operative communication with the spray nozzle assembly 6. In operation, the slurry or liquid solution is dispersed in the upper portion of the drying chamber (by means of the spray wheel 7) in the form of a mist of fine products.

Hot gas, from a furnace or the like, is introduced into the spraying chamber by way of a conduit 10. A conically shaped distribution head 11, provided with a series of vanes 12 causes the upwardly directed stream of hot gas, i.e., air, to be distributed radially and into the mist of fine droplets issuing from the spray wheel 7.

In this manner, mositure or water is rapidly vaporized from the droplets, leaving residual particles of dry solids which fall into the conically shaped discharge zone or portion 4. The cooled exhaust gas is discharged from the conduit 14 positioned intermediate between the upper and lower ends of the spray dryer.

Turning now to more specific details of the present invention, a series of slots 15 are formed or cut into the conical discharge zone 4, directly above the discharge outlet 16, i.e., at the base or apex of the cone.

When the system is operating outside air is pulled in through the slots 15 by way of a suction or exhaust fan 30, driven by suitable means such as the motor 31. The air conveys the fallen solid particulates immediately as they are collected in the discharge zone 4, via conduits 17, into the upper portion of a cyclone separator indicated at 20.

The cyclone separator 20, which as is known in the art, uses centrifugal force to amplify the settling rate, comprises a vertical cylinder 21, a conical bottom 22, and a tangential inlet 23. As shown, the cyclone 20 further includes a discharge outlet 24 and an upper gas outlet 25, the latter being connected to and in operable communication with the exhaust fan 30.

In operation, the incoming stream of the air-solids mixture, issuing from the discharge outlet of the spray dryer, receives a rotating motion on entrance to the cyclone separator. The vortex so formed develops centrifugal force which acts to throw the solid particulates radially toward the wall. In this manner there is created a strong centrifugal force, acting radially, in contrast to the relatively weak gravitational forces (acting vertically) such as in the chamber of the spray dryer. The solids from the conical bottom of the cyclone pass through the discharge outlet 24 and are withdrawn by a screw conveyor 26. A rotary valve (not shown) is positioned within the discharge outlet 24 and serves to establish an "air-lock" during the operation of the spray drying system.

It has been discovered that the plugging problem, associated with spray dryer discharge outlets, is substantially nonexistent in the cyclone. While not intending to be bound by any particular theory, it is believed that because the dried particles are conveyed from the spray chamber by a mass or stream of air they tend to lose their tackiness and abrasive characteristics. This may also be a result of the "cooling" action of the air that is pulled through the slots or aperatures. Further, of course, the centrifugal forces in the cyclone eliminates or reduces the effect of "arching", etc.

With reference again to FIG. 1, the exhaust outlet of the fan 30 is connected, by way of conduit 32, to the exhaust gas outlet of the spray dryer. The gas in conduit 14 is preferably conveyed to a dust collector system (not shown) which collects and separates any solids in the gas stream. The solids discharge outlet of the dust collector system may be connected to the screw conveyor 26.

With reference now to FIG. 2, there is shown an alternate form of a spray dryer that may be used in combination with the unique discharge system of the present invention. The spray dryer illustrated in FIG. 2 is cocurrent in operation, i.e., the mist of fine droplets issuing from the spray nozzle of spray wheel 35 are thrown radially into a stream of hot gas which enters the top of the chamber through conduit 36.

It should be expressly understood, however, that reference to the various types of spray dryers is not intended to limit the discharge system of the invention to a particular spray dryer design. As will be readily appreciated by those skilled in the art, the present invention provides a truly unique discharge system for a spray dryer. While the various components of the apparatus of the invention are known, such as cyclone separators, exhaust fans and the like, the unique combination of same is truly remarkable and overcomes a problem long sought to be solved by prior art workers. In this regard spray drying is often an inefficient and highly difficult system to operate. As known, the performance of a spray dryer depends on the time the droplets spend in the drying chamber. While this depends on many factors, including the size and shape of the chamber, etc., clearly if the discharge outlet is continually plugged, not only must the spray dryer be shut down and cleaned, any control of the characteristics or properties of the spray dried product is materially affected.

What is claimed is:

1. In a spray drying apparatus having a cylindrical drying chamber, said chamber having an upper portion and a second lower, inverted, conically-shaped, solids discharge portion; spray means for dispersing a liquid into the form of a mist of fine droplets in said upper portion of said drying chamber; conduit means for introducing a stream of hot gas into said chamber and into direct contact with said liquid droplets; exhaust conduit means for withdrawing said hot gas from said drying chamber; and a discharge outlet positioned at the apex of said inverted conically-shaped solids discharge portion for removal of particulate solids, the improved apparatus comprising the combination of:

1. a high velocity rotating disc for dispersing said liquid in the form of fine droplets in the upper portion of said drying chamber;
   2. conduit means for introducing said stream of hot gas, comprising a gas distribution head provided with a series of intermittently spaced vanes which cause said stream of hot gas to be distributed radially and into direct contact with said mist of fine droplets for vaporizing said droplets, a downward flow of dry solids thereby being established within said chamber;
   3. exhaust conduit means within the upper portion of said drying chamber for drawing said hot gas from the downward flow of dry solids;
   4. a series of apertures cut into said conically-shaped discharge portion immediately above said discharge outlet;
   5. an exhaust fan positioned downstream of said discharge outlet and in direct operable communication therewith, said exhaust fan (a) providing suction at said outlet for drawing cool ambient air into said discharge portion through said apertures, said ambient air being further cooled by expansion thereof as said air is drawn into said chamber through said apertures, and (b) drawing said cooled ambient air along with said dried solids through said discharge outlet; and
   6. a solids separator intermediate of said exhaust fan and said discharge outlet, and in operative communication therewith;

cohesive solids thereby being air-conveyed from said discharge portion of said chamber and drawn immediately to said solids separator, the cooling effect of said ambient air on said dried solids tending to reduce tackiness in said solids.

2. An apparatus according to claim 1 wherein said gas-solids separator is a cyclone separator having a vertical, cylindrical chamber, a conical bottom, and a tangential inlet in operative communication with said solids discharge outlet of said drying chamber whereby said stream of air-solids issuing from said discharge portion of said drying chamber is caused to be propelled radially toward the walls of the chamber of the cyclone.

* * * * *